US012777269B2

(12) United States Patent
Chowdhury et al.

(10) Patent No.: US 12,777,269 B2
(45) Date of Patent: Oct. 27, 2026

(54) DEVICE AND METHOD FOR PERFORMING READOUT OF A PIXEL ARRAY ASSOCIATED WITH AN IMAGE SENSOR

(71) Applicant: Samsung Electronics Co., Ltd., Suwon-si (KR)

(72) Inventors: Ankush Chowdhury, Bengaluru (IN); Prashant Govindlal Rupapara, Bengaluru (IN); Anup Ramesh Bhat, Bengaluru (IN); Akshaya A Mukundan, Bengaluru (IN); Anmol Satyanarayan Zanwar, Bengaluru (IN); Vishwanath Vijaykumar Hiremath, Bengaluru (IN)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 111 days.

(21) Appl. No.: 18/613,682

(22) Filed: Mar. 22, 2024

(65) Prior Publication Data

US 2024/0323573 A1 Sep. 26, 2024

(30) Foreign Application Priority Data

Mar. 24, 2023 (IN) ............................ 202341021143

(51) Int. Cl.
*H04N 25/78* (2023.01)
*H04N 25/58* (2023.01)

(52) U.S. Cl.
CPC ............. *H04N 25/78* (2023.01); *H04N 25/58* (2023.01)

(58) Field of Classification Search
CPC ............................... H04N 25/78; H04N 25/58
USPC ........................................................ 348/302
See application file for complete search history.

(56) References Cited

U.S. PATENT DOCUMENTS

| | | | | |
|---|---|---|---|---|
| 8,605,177 | B2 | 12/2013 | Rossi et al. | |
| 9,338,372 | B2 | 5/2016 | Cho et al. | |
| 9,628,732 | B2 | 4/2017 | Velichko | |
| 2006/0261996 | A1 * | 11/2006 | Augusto | H03M 1/125 341/155 |
| 2007/0285526 | A1 | 12/2007 | Mann et al. | |
| 2014/0063300 | A1 | 3/2014 | Lin et al. | |

FOREIGN PATENT DOCUMENTS

JP 2013-093875 A 5/2013

OTHER PUBLICATIONS

Indian Office Action dated Dec. 11, 2025 for corresponding Indian Application No. 202341021143.

* cited by examiner

*Primary Examiner* — Joel W Fosselman
(74) *Attorney, Agent, or Firm* — Harness, Dickey & Pierce, P.L.C.

(57) ABSTRACT

A method for performing readout of a pixel array associated with an image sensor may include for a first exposure row and one or more additional exposure rows of the pixel array, detecting, using processing circuitry, completion of exposure operations of the first exposure row and the one or more additional exposure rows, and reading, using the processing circuitry, pixel values from sets of columns associated with sets of analog to digital converters (ADCs) corresponding to the first exposure row and the one or more additional exposure rows.

14 Claims, 9 Drawing Sheets

DEVICE AND METHOD FOR PERFORMING READOUT OF A PIXEL ARRAY ASSOCIATED WITH AN IMAGE SENSOR

CROSS-REFERENCE TO RELATED APPLICATION

This U.S. non-provisional application claims the benefit of priority under 35 U.S.C. § 119 to Indian Provisional Application No. 202341021143, filed on Mar. 24, 2023 in the Office of the Controller General of Patents, Designs and Trade Marks, the disclosure of which is incorporated by reference herein in its entirety.

BACKGROUND

Various example embodiments of the inventive concepts generally relate to image processing, and more specifically relate to a device, system, and/or a method for performing staggered High Dynamic Range (HDR) readout of a pixel array in a column interleaved manner.

Imaging devices having image sensors generally use various techniques to capture an image. For example, a pixel array readout is performed to read electrical charge of individual pixels on the image sensors to create the image. The image sensor comprises a matrix of pixels and readout of the values from the pixels (e.g., readout of the charges accumulated by the pixels) is performed to form, create, and/or generate the final image. Analog to digital converters (ADCs) may be provided to facilitate forming the final image. Dynamic Range is a critical specification in all image sensors. The dynamic range may be 20*log 10 (e.g., max signal level/noise floor). The noise floor is limited by the noise from ADCs and/or pixel and/or the quantization noise.

The imaging device captures the image as per associated exposure times. Exposure times affects the amount of light each pixel accumulates during the respective readouts (e.g., readout periods, accumulation periods, etc.). For instance, longer exposure times lead to more light reaching the image sensor (e.g., the pixels of the image sensor) and increasing the level of brightness of the generated image. The exposure time may be determined by and/or controlled by the device's shutter speed. As a result, each row and/or column of the pixel array is exposed to light at a slightly different time, depending on where the row or column is located on the image sensor.

In the field of imaging devices, High Dynamic Range (HDR) refers to combining multiple images generated with different exposures to create a final image having a broader range of brightness. This allows enhanced details to be included and/or visible in the images as details in both the dark and bright areas may be preserved. Further, HDR enables accurate color reproduction in images, reduction in clipping, and/or increased details in low light. With respect to HDR readouts, there are multiple readout methods. One example of an existing readout method is a line interleaved HDR. FIGS. 1A-1B shows a pixel array 100 being readout according to the line interleaved method. The pixel array 100 may be associated with multiple ADCs 102 having different ramp gains for both long exposure and short exposure of a frame. The pixel array 100 may include multiple rows and columns. The ADCs 102 alternate between short exposure and long exposure reads every time-step (e.g., H-time). In the present example, 1 time-step refers to a time period for performing a readout of a row of the pixel array, e.g., 1 row may be read in 1 time-step and a next row may be read in a next time-step, etc.

Initially, as seen in FIG. 1A, at 1-H time, a long read operation of one row 104 of the pixel array 100 may be performed via the ADCs 102. Next, at 2-H time, a short read of another row 106 of the pixel array 100 may be performed via the ADCs 102. Then, as seen in FIG. 1B, at 3-H time, a long read of another row 104+1 of the pixel array 100 may be performed via the ADCs 102. Next, at 4-H time, a short read of another row 106+1 of the pixel array 100 may be performed via the ADCs 102.

In the line interleaved method as shown in FIGS. 1A-1B, alternate long exposure read and short exposure read of all the columns for a particular row is performed. However, this method requires a change in the ramp gain every H-time. Since two different ramp gains are used to read long exposure and short exposure frames, more time is required for the ADCs 102 to settle. The H-time increases significantly and the frames per second (fps) reduces significantly.

The line interleaved technique as shown in FIGS. 1A-1B requires image reconstructed using different exposures and same/different ramp gains. Using different gains for different exposures leads to settling issues, which further leads to slower read time and/or reduction in the frames per second (fps).

Hence, there is a desire and/or need to provide techniques that can overcome the above-discussed problems related to settling times and reduced fps.

SUMMARY

This summary is provided to introduce a selection of concepts, in a simplified format, that are further described in the detailed description of various example embodiments of the inventive concepts.

In at least one example embodiment, a method for performing a readout of a pixel array associated with an image sensor is disclosed. The method comprises, for a first exposure row and one or more additional exposure rows of the pixel array, detecting, using processing circuitry, completion of exposure operations of the first exposure row and the one or more additional exposure rows, and reading, using the processing circuitry, pixel values from sets of columns associated with sets of analog to digital converters (ADCs) corresponding to the first exposure row and the one or more additional exposure rows.

In at least one example embodiment, a method for performing readout of a pixel array associated with an image sensor is disclosed. The method comprises, for a first exposure row and a second exposure row of the pixel array, the pixel array connected to a first set of analog to digital converters (ADCs) having a first ramp gain and a second set of ADCs having a second ramp gain, detecting, using processing circuitry, completion of a first exposure operation of an image frame for the first exposure row and completion of a second exposure operation of the image frame for the second exposure row, reading, using the processing circuitry, pixel values from a first set of columns associated with the first set of ADCs from among a plurality of columns in the first exposure row of the pixel array within a first time period, and reading, using the processing circuitry, pixel values from a second set of columns associated with the second set of ADCs from among a plurality of columns in the second exposure row of the pixel array within the first time period, wherein the first set of columns are different from the second set of columns.

In at least one example embodiment, a system for performing readout of a pixel array associated with an image sensor is disclosed. The system comprises processing circuitry, the processing circuitry being configured to cause the system to, for a first exposure row and one or more additional exposure rows of the pixel array, detect completion of corresponding exposure operations of the first exposure row and the one or more additional exposure rows, and read pixel values from sets of columns associated with sets of analog to digital converters (ADCs) corresponding to the first exposure row and one or more additional exposure rows.

In at least one example embodiment, a system for performing readout of a pixel array associated with an image sensor is disclosed. The system comprises processing circuitry, the processing circuitry being configured to cause the system to, for a first exposure row and a second exposure row of the pixel array, the pixel array connected to a first set of analog to digital converters (ADCs) having a first ramp gain and a second set of ADCs having a second ramp gain, detect completion of a first exposure operation of an image frame for the first exposure row and completion of a second exposure operation of the image frame for the second exposure row, read pixel values from a first set of columns associated with the first set of ADCs from among a plurality of columns in the first exposure row of the pixel array within a first time period, and read pixel values from a second set of columns associated with the second set of ADCs from among the plurality of columns in the second exposure row of the pixel array within the first time period, wherein the first set of columns are different from the second set of columns.

To further clarify the advantages and features of the inventive concepts, a more particular description of various example embodiments of the inventive concepts will be rendered by reference to the appended drawings. It is appreciated that these drawings depict only typical example embodiments of the inventive concepts and are therefore not to be considered limiting of its scope. Various example embodiments of the inventive concepts will be described and explained with additional specificity and detail in the accompanying drawings.

BRIEF DESCRIPTION OF THE DRAWINGS

These and other features, aspects, and advantages of the example embodiments of the inventive concepts will become better understood when the following detailed description is read with reference to the accompanying drawings in which like characters represent like parts throughout the drawings, wherein.

Figure 1A:
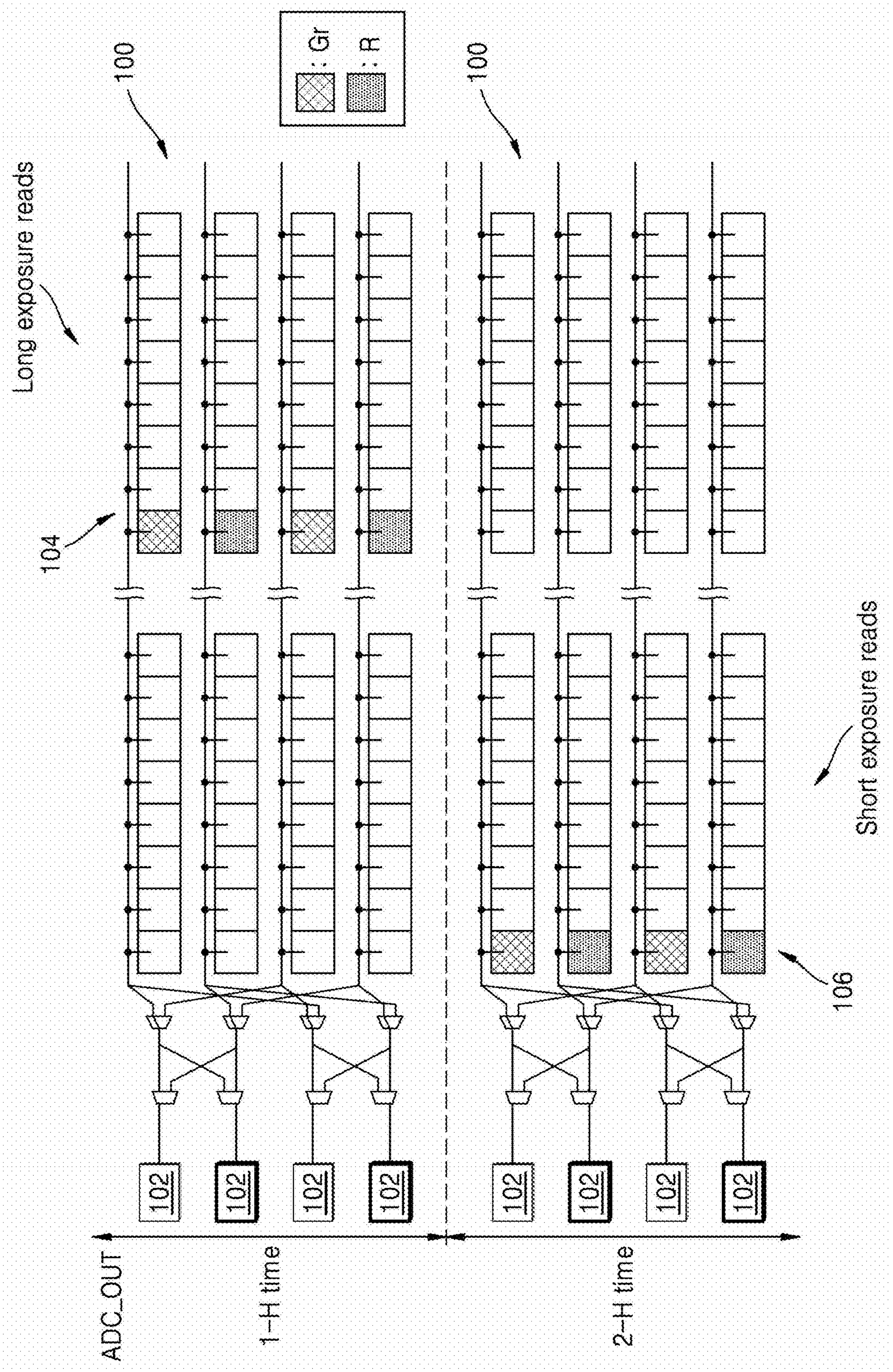
FIG. 1A (Prior art)
FIGS. 1A-1B illustrate a schematic diagram of pixel array being read by a line interleaved method, in accordance with the conventional art.
Figure 1B:
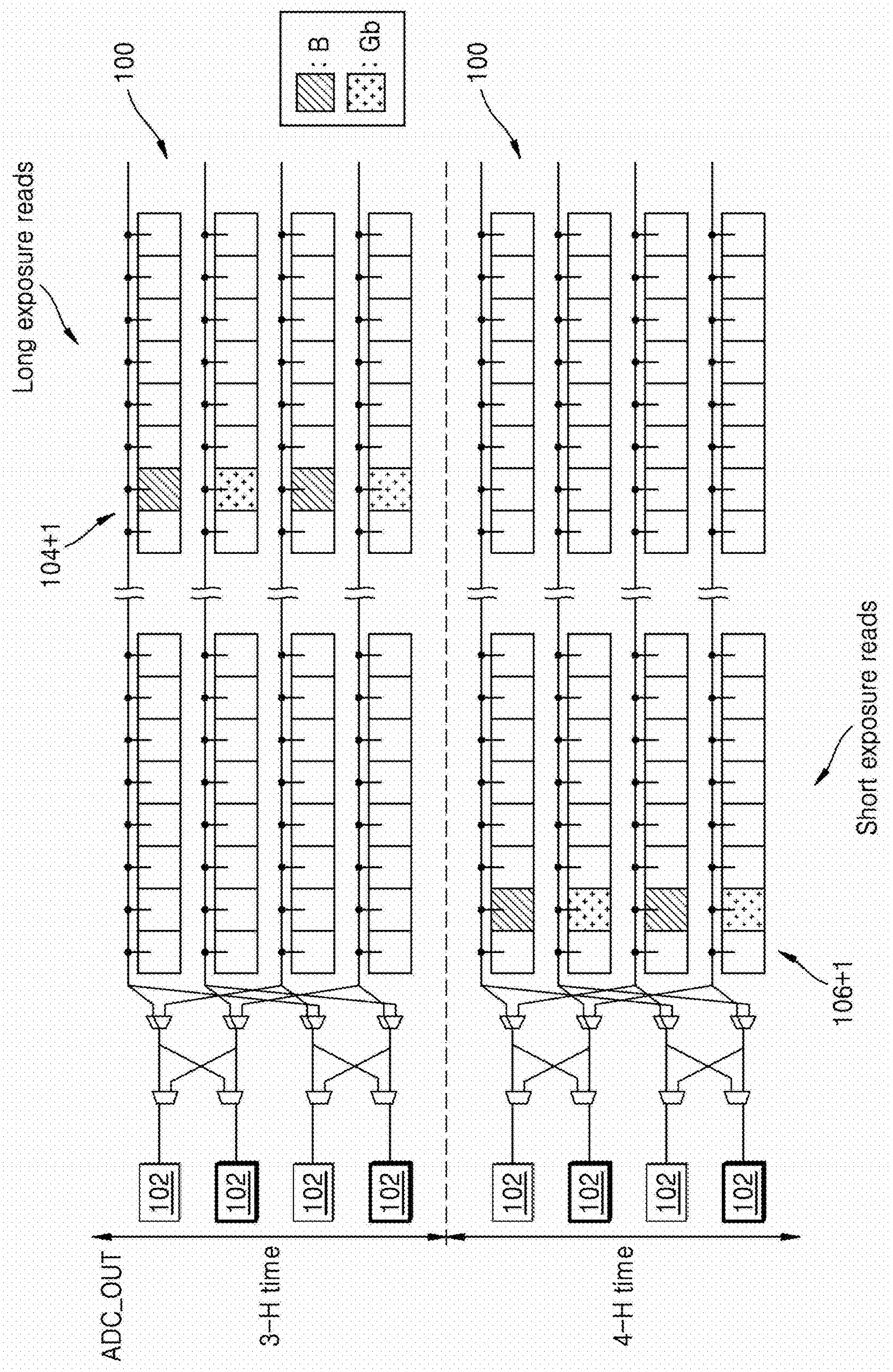
FIG. 1B (Prior art)

Further, a person of ordinary skill in the art will appreciate that those elements in the drawings are illustrated for simplicity and may not have necessarily been drawn to scale. For example, the flow charts illustrate the method in terms of operations involved to help to improve the understanding of various aspects of the example embodiments. Furthermore, in terms of the construction of the device, one or more components of the device may have been represented in the drawings by conventional symbols, and the drawings may show only those specific details that are pertinent to understanding the example embodiments of the inventive concepts so as not to obscure the drawings with details that will be readily apparent to those of ordinary skill in the art having the benefit of the description herein.

DETAILED DESCRIPTION

For the purpose of promoting an understanding of the principles of one or more example embodiments of the inventive concepts, reference will now be made to the example embodiments illustrated in the drawings and specific language will be used to describe the same. It will nevertheless be understood that no limitation of the scope of example embodiments of the inventive concepts is thereby intended, such alterations and further modifications in the illustrated system, and such further applications of the principles of the inventive concepts as illustrated therein being contemplated as would normally occur to one of ordinary skill in the art to which the inventive concepts relates.

It will be understood by those of ordinary skill in the art that the foregoing general description and the following detailed description are explanatory of the inventive concepts and are not intended to be restrictive thereof.

Reference throughout this specification to “an aspect”, “another aspect” or similar language means that a particular feature, structure, or characteristic described in connection with the example embodiments are included in at least one example embodiment of the inventive concepts. Thus, appearances of the phrase “in at least one example embodiment”, “in one or more example embodiments”, “in some example embodiments”, and similar language throughout this specification may, but do not necessarily, all refer to the same example embodiment.

The terms “comprise”, “comprising”, or any other variations thereof, are intended to cover a non-exclusive inclusion, such that a process or method that comprises a list of operations does not include only those operations but may include other operations not expressly listed or inherent to such process or method. Similarly, one or more devices or sub-systems or elements or structures or components preceded by “comprises . . . a” does not, without more constraints, preclude the existence of other devices or other sub-systems or other elements or other structures or other components or additional devices or additional sub-systems or additional elements or additional structures or additional components.

The various example embodiments disclosed herein and the various features and advantageous details thereof are explained more fully with reference to the non-limiting one or more example embodiments that are illustrated in the accompanying drawings and detailed in the following description. Descriptions of well-known components and processing techniques are omitted so as to not unnecessarily obscure the example embodiments herein. Also, the various example embodiments described herein are not necessarily mutually exclusive, as some example embodiments can be combined with one or more other example embodiments to form new example embodiments. The term "or" as used herein, refers to a non-exclusive or unless otherwise indicated. The examples used herein are intended merely to facilitate an understanding of ways in which the example embodiments herein can be practiced and to further enable those of ordinary skill in the art to practice the example embodiments herein. Accordingly, the examples should not be construed as limiting the scope of the example embodiments herein.

As is traditional in the field, example embodiments may be described and illustrated in terms of modules and/or engines that carry out a described function and/or functions. These modules and/or engines, which may be referred to herein as units and/or blocks or the like, and/or may include blocks or units, are physically implemented by analog and/or digital circuits such as logic gates, integrated circuits, microprocessors, microcontrollers, memory circuits, passive electronic components, active electronic components, optical components, hardwired circuits, or the like, and may optionally be driven by firmware and/or software, etc. The circuits may, for example, be embodied in one or more semiconductor chips, and/or on substrate supports such as printed circuit boards and the like. The circuits comprising a block may be implemented by dedicated hardware, by a processor (e.g., one or more programmed microprocessors and associated circuitry), or by a combination of dedicated hardware to perform some functions of the block and a processor to perform other functions of the block. Each block of the example embodiments may be physically separated into two or more interacting and discrete blocks without departing from the scope of the example embodiments of the inventive concepts. Likewise, the blocks of the example embodiments may be physically combined into more complex blocks without departing from the scope of the example embodiments of the inventive concepts.

The accompanying drawings are used to help easily understand various technical features and it should be understood that the example embodiments presented herein are not limited by the accompanying drawings. As such, the example embodiments of the inventive concepts should be construed to extend to any alterations, equivalents, and substitutes in addition to those which are particularly set out in the accompanying drawings. Although the terms first, second, etc. may be used herein to describe various elements, these elements should not be limited by these terms. These terms are generally only used to distinguish one element from another.

Various example embodiments will be described below in detail with reference to the accompanying drawings.

Figure 2:
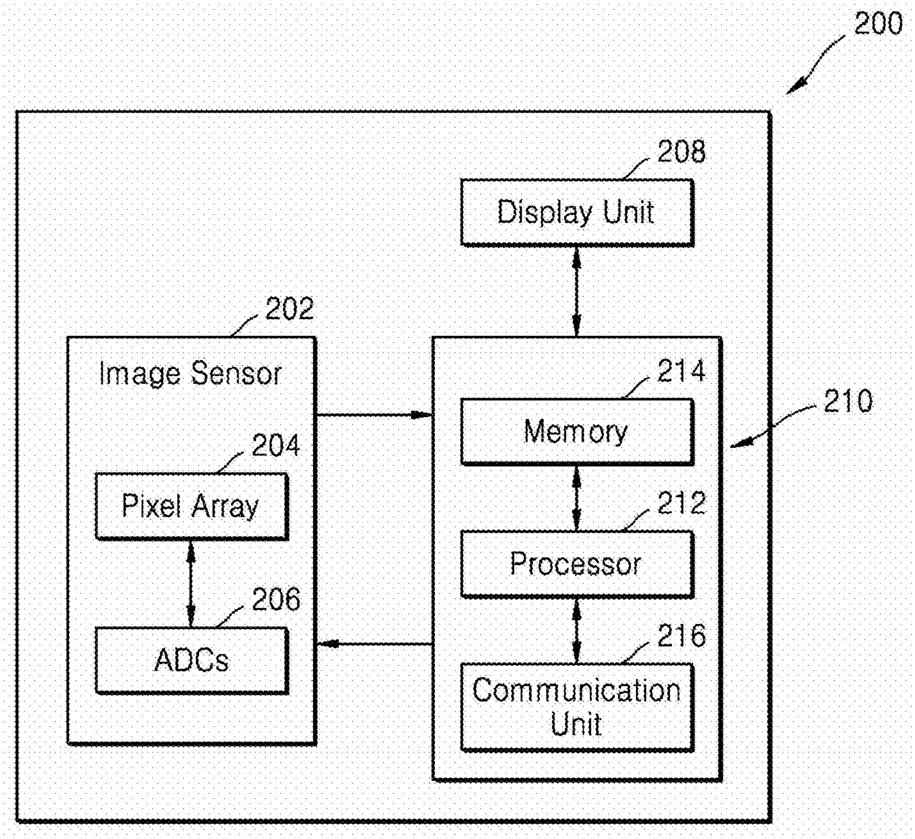
FIG. 2 illustrates a block diagram of a device for performing a readout of a pixel array, according to one or more example embodiments disclosed herein.

FIG. 2 illustrates a block diagram of a device 200 for performing readout (e.g., performing a readout operation, performing a read, performing a read operation, etc.) of a pixel array, according to one or more example embodiments. The device 200 may be associated with a processing circuitry 210 configured to perform readout of the pixel array.

The device 200 includes at least one image sensor 202. The device 200 may be an electronic device capable of capturing images, e.g., an imaging device, a camera, a videorecorder, etc. The image sensor 202 may include at least one pixel array 204. The pixel array 204 includes a plurality of pixels. In the pixel array 204, the plurality of pixels may be arranged in a matrix form, e.g., in rows and columns. In other words, the pixel array 204 may be associated with a plurality of rows and a plurality of columns. The pixel array may be of any suitable size, such as a 32×32 matrix, but is not limited thereto.

The image sensor 202 may further be associated with a plurality of analog to digital converters (ADCs) 206. The plurality of ADCs 206 may facilitate readout of values (e.g., accumulated charges, voltages, etc.) from the rows of the pixel array 204 from corresponding output lines after exposures, e.g., long and/or short exposures, as will be described further below. The plurality of ADCs 206 may further be divided into one or more sets of ADCs based on corresponding ramp gains. For instance, the plurality of ADCs 206 may include a first set of ADCs having a first ramp gain (e.g., a first desired ramp gain, etc.) and one or more additional sets of ADCs having corresponding second ramp gains (e.g., a second desired ramp gain, etc.). In some example embodiments, the ramp gains for the corresponding ADCs may be fixed, e.g., the first set of ADCs may have their own fixed first ramp gain while the one or more additional sets of ADCs may have their own fixed corresponding second ramp gains, but the example embodiments are not limited thereto.

In one example, the plurality of ADCs 206 may include "N" ADCs and may include "N/2" ADCs in a first set of ADCs and the remaining "N/2" ADCs may be included in a second set of ADCs, where N is an integer, but the example embodiments are not limited thereto.

In another example, the plurality of ADCs 206 may include "N" ADCs and may include "N/3" ADCs as the first set of ADCs, "N/3" ADCs as the second set of ADCs, and "N/3" ADCs as the third set of ADCs, etc. In this example, the second set of ADCs and the third set of ADCs may correspond to the one or more additional sets of ADCs. Similarly, in other examples, the one or more additional set of ADCs may include fourth set of ADCs, a fifth set of ADCs, and so on, without departing from the scope of the example embodiments of the inventive concepts. Each of the sets of ADCs have their own fixed ramp gains, but are not limited thereto. In at least one example embodiment, the ramp gains may be fixed at the beginning of a frame and may remain fixed till the end of the frame.

The device 200 may further include at least one display unit 208 (e.g., a display device, a display panel, etc.) configured to display the image captured using the image sensor 202 at a display screen of the device 200. As non-limiting examples, the display unit 208 may be Light Emitting Diode (LED), Liquid Crystal Display (LCD), Organic Light Emitting Diode (OLED), Active Matrix Organic Light Emitting Diode (AMOLED), and/or Super Active Matrix Organic Light Emitting Diode (S-AMOLED) screen, etc. The display unit 208 may be of varied resolutions (e.g., screen resolutions, pixel resolutions, etc.).

The device 200 may further include the processing circuitry 210 (e.g., system, system-on-chip (SOC), etc.) configured to perform pixel signal readout, e.g., values from the rows of the pixel array 204. The processing circuitry 210 may further be configured to facilitate ADC conversion of the read values (pixel signals). The processing circuitry 210 may further include at least one processor 212, at least one memory 214, and/or at least one communication unit 216, etc., but is not limited thereto, and for example, may include a greater or lesser number of constituent components. In at least one example embodiment, the processing circuitry 210 is integrated within the device 200. In at least one example embodiment, the processing circuitry 210 may be provided remote to and/or external to the device 200, such as, via a cloud-based unit and/or a wireless communication unit in communication with a wireless interface of the device 200 (not shown), via a wired cable connected to a communication port of the device 200 (not shown), etc. In at least one example embodiment, the processing circuitry 210 may be provided in a distributed manner in which one or more components of the processing circuitry 210 are integrated within the device 200 and one or more components of the processing circuitry 210 are remote to the device 200. According to some example embodiments, the processing circuitry 210 may include hardware or hardware circuit including logic circuits; a hardware/software combination such as a processor executing software and/or firmware; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc., but is not limited thereto.

The processor 212 can be a single processing unit or several units, all of which could include multiple computing units. The processor 212 may be implemented as one or more microprocessors, microcomputers, microcontrollers, digital signal processors, central processing units, state machines, logic circuitries, and/or any devices that manipulate signals based on operational instructions. Among other capabilities, the processor 212 is configured to fetch and execute computer-readable instructions and/or data stored in the memory 214.

The memory 214 corresponds to a memory unit (e.g., memory device, etc.) that includes one or more non-transitory computer-readable storage media. The memory 214 may include non-volatile storage elements, but is not limited thereto. Examples of such non-volatile storage elements may include magnetic hard discs, optical discs, floppy discs, flash memories, and/or forms of electrically programmable memories (EPROM) and/or electrically erasable and programmable (EEPROM) memories. In addition, the memory may, in some examples, be considered a non-transitory storage medium. The term "non-transitory" may indicate that the storage medium is not embodied in a carrier wave or a propagated signal. However, the term "non-transitory" should not be interpreted to mean that the memory is non-movable. In certain examples, a non-transitory storage medium may store data that can, over time, change (e.g., in Random Access Memory (RAM) and/or cache.

The memory 214 may include any non-transitory computer-readable medium known in the art including, for example, volatile memory, such as static random-access memory (SRAM) and/or dynamic random-access memory (DRAM), etc., and/or non-volatile memory, such as read-only memory (ROM), erasable programmable ROM, flash memories, hard disks, optical disks, and/or magnetic tapes, etc.

The communication unit 216 (e.g., communication interface, communication device, etc.) is configured to communicate data, e.g., voice, video, audio, images, or any other data, over a communication network (not shown). Further, the communication unit 216 may include a communication port and/or a communication interface for sending and/or receiving notifications on the device 200 via the communication network. The communication port and/or the communication interface may be a part of the processor 212 and/or may be a separate component. The communication port may be created in software and/or may be a physical connection in hardware. The communication port may be configured to connect with the communication network, external media, the display unit 208, and/or any other components in the device 200, or any combinations thereof. The connection with the communication network may be a physical connection, such as a wired Ethernet connection, and/or may be established wirelessly as discussed above. Likewise, the additional connections with other components of the device 200 may be physical and/or may be established wirelessly.

Details of the column interleaved readout technique will now be described. Initially, an exposure of a frame of an image may be initiated. In at least one example embodiment, the exposure may include multiple exposures (e.g., exposure time periods, etc.), such as, exposure A (e.g., exposure time period A), exposure B (e.g., exposure time period B), exposure C (e.g., exposure time period C), and so on. In at least one example embodiment, the exposure may include at least one long exposure (e.g., a first exposure time) as well as at least one short exposure (e.g., a second exposure time which is shorter in duration than the first exposure time), but is not limited thereto.

The processing circuitry 210 may be configured to detect completion of the exposure times (e.g., exposure periods, etc.) of the first exposure row and the one or more additional exposure rows, etc. Further, the processing circuitry 210 may be configured to read values from the first exposure row and the one or more additional exposure rows, etc.

The first exposure row and the one or more additional exposure rows may each be associated with a corresponding set of ADCs. Considering the example of two exposure rows and two exposure times (e.g., a long exposure and a short exposure), the first exposure row and the second exposure row may be associated with the first set of ADCs and the second set of ADCs respectively, but the example embodiments are not limited thereto.

Further, the processing circuitry 210 may be configured to facilitate reading and/or simultaneous reading of values from the first exposure row and the one or more additional exposure rows, in that, specific columns from the first exposure row and the one or more additional exposure rows may be selected for reading (e.g., readout). The reading may then be done via the corresponding set of ADCs. Considering the example of two exposure rows and two exposure times (e.g., the long exposure and the short exposure), simultaneous reading from the first and second exposure rows may be performed, but is not limited thereto. However, from the first exposure row, a first set of columns may be read by the first set of ADCs instead of the complete columns (e.g., all of the columns of the image sensor 202), etc. Similarly, from the second exposure row, a second set of columns may be read by the second set of ADCs instead of the complete columns, etc. Thus, simultaneous reading of the first and second exposure rows may be performed without intermixing of the values of long and short exposure since the first set of ADCs and the second set of ADCs correspond to the first exposure row and the second exposure row respectively.

Considering one or more additional second rows, the processing circuitry 210 may be configured to facilitate reading and/or simultaneous reading of the corresponding set of columns from the first exposure row and the one or more additional exposure rows in a single time period (e.g., a single H-time). For the remaining sets of columns from the first exposure row and the one or more additional exposure rows, the readout may be performed in subsequent time period (e.g., subsequent H-times). Thus, in a single H-time period, say, a 1-H time period, the processing circuitry 210 may be configured to read, from the first set of ADCs, pixel values from a first set of columns in the first exposure row of the pixel array 204. In the same 1-H time period, the processing circuitry 210 may also be configured to read, from the one or more additional sets of ADCs, pixel values from corresponding second set of columns in the one or more additional exposure rows of the pixel array. As the first set of ADCs are dedicated for the first exposure row and the one or more additional sets of ADCs (2, 3, . . . n) are dedicated for the one or more additional exposure rows (2, 3, . . . n), there is no intermixing of readout values.

Further, in subsequent H-times (e.g., subsequent H-time periods), the remaining columns (other than the first set of columns already read at 1-H time period) from the first exposure row and the remaining columns (other than the corresponding second set of columns already read at 1-H time period) from one or more additional exposure rows can be read via the dedicated sets of ADCs.

It is appreciated that the examples may be described for first and second exposure rows, however, the example embodiments of the inventive concepts are not limited thereto and may also be applicable for additional exposure rows as well. The functionality of the processing circuitry 210 will now be described with reference to first exposure row (e.g., a row with a long exposure time period) and second exposure row (e.g., a row with a short exposure time period), however, the details may be equally applicable for multiple exposure rows (e.g., rows with multiple exposure time periods), etc.

Figure 3A:
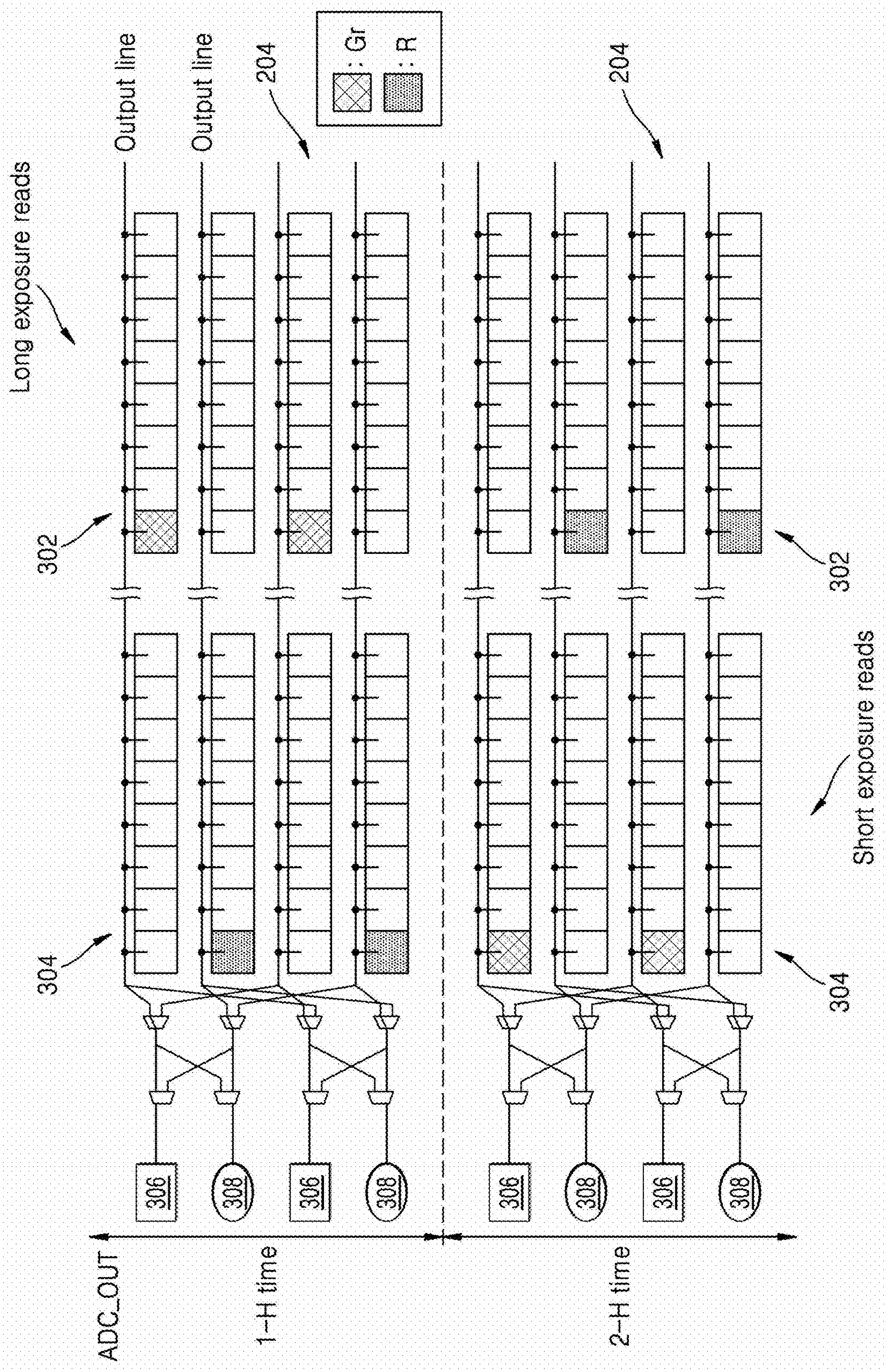
FIGS. 3A-3B illustrate an example pixel array and readout being performed for long and short exposures over multiple H-times, according to one or more example embodiments disclosed herein.
Figure 3B:
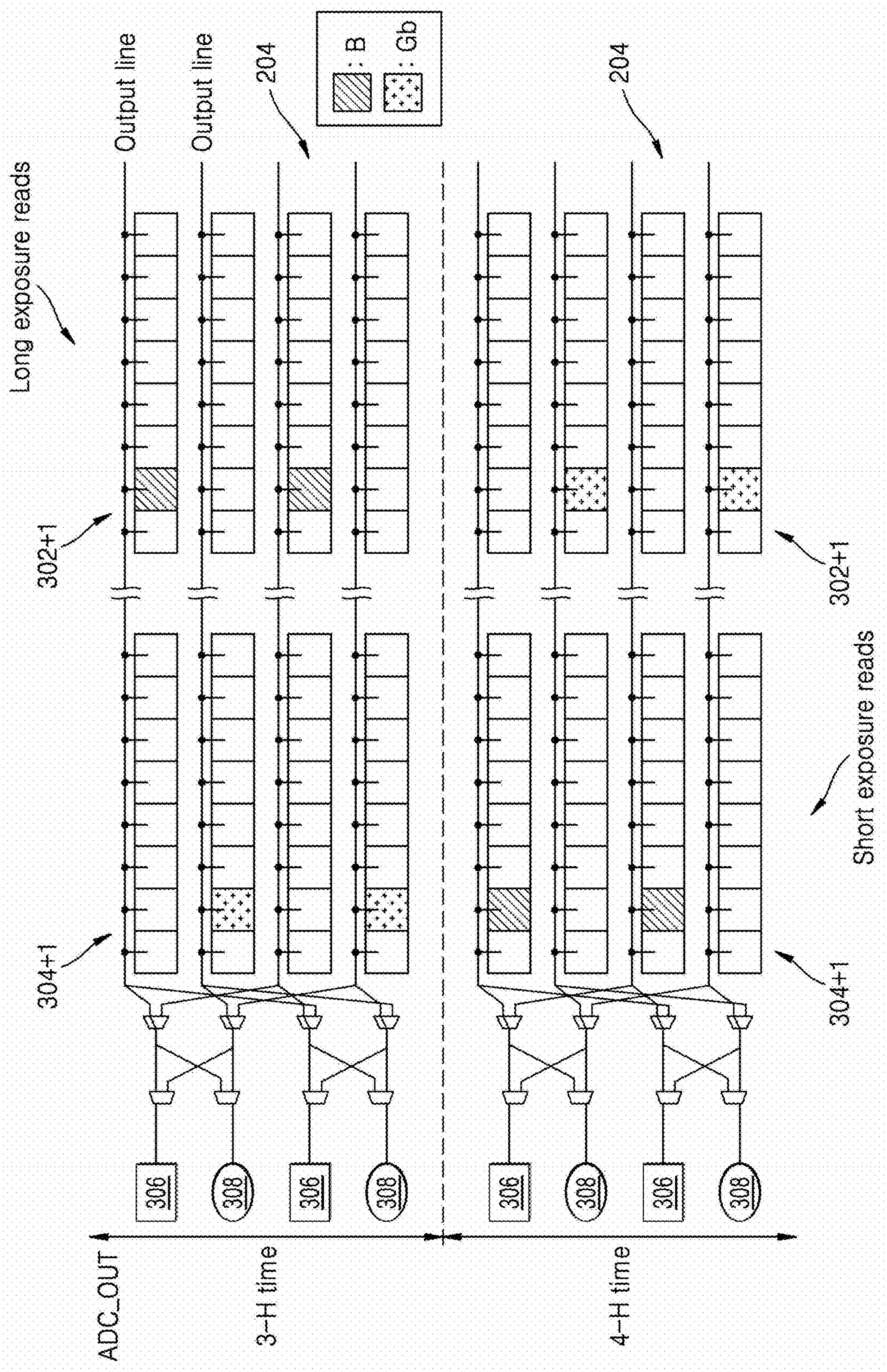

Reference is made to FIGS. 3A-3B which illustrates an example pixel array 204 (e.g., a pixel array having 4 columns) and readout being performed for long and short exposures over multiple time-steps (e.g., multiple H-times), however the example embodiments are not limited thereto, and for example, the pixel array may have greater or lesser number of columns and/or may have more than or less than two exposure time periods. Initially, the long exposure time (e.g., a first exposure time period) for the first exposure row and the short exposure time (e.g., a second exposure time period) for the second exposure row may be completed. For 1-H time, the first exposure row may be row 302 and the second exposure row may be row 304, but the example embodiments are not limited thereto. As would be understood to a person of ordinary skill in the art, for a given row, the long exposure may be performed prior to the short exposure, but is not limited thereto. In the illustrated at least one example embodiment, the first and second exposure rows are different rows in which long exposure is performed for the first exposure row 302 and short exposure is being performed for the second exposure row 304, etc.

As seen in FIG. 3A, the first set of ADCs 306 and the second set of ADCs 308 are provided along with respective output lines (e.g., data output lines, pixel readout lines, etc.). At 1-H time, pixel values from the first set of columns from among the plurality of columns in the first exposure row 302 are read via the first set of ADCs 306. Also, at 1-H time, pixel values from the second set of columns from among the plurality of columns in the second exposure row 304 are read via the second set of ADCs.

The first and second set of columns may be different from each other, but are not limited thereto. In the illustrated at least one example embodiment, the first set of columns are odd columns ($1^{st}$ and $3^{rd}$ columns) while the second set of columns are even columns ($2^{nd}$ and $4^{th}$ columns). It is appreciated that the illustrated at least one example embodiment is non-limiting and in other example embodiments, the first set of columns may be even columns while the second set of columns may be odd columns, etc. Additionally, for multiple exposure rows, the corresponding sets of columns may be selected (for example, n/3 columns may be selected for reading in case of 3 exposure rows, etc.).

Thus, at 1-H time, values from the first exposure row 302 (e.g., long exposure read of first set of columns) as well as values from the second exposure row 304 (e.g., short exposure read for second set of columns) are read simultaneously by the dedicated sets of ADCs.

At 2-H time, the remaining sets of columns may be read from the first exposure row 302 and the second exposure row 304. As seen in FIG. 3A, at 2-H time, the second set of columns (e.g., the even columns $2^{nd}$ and $4^{th}$) of the first exposure row 302 and the first set of columns (e.g., the odd columns $1^{st}$ and $3^{rd}$) of the second exposure row 304 are read. It is to be noted that the read for the first exposure row 302 is again done via the first set of ADCs 306 and the read for the second exposure row 304 is again done via the second set of ADCs 308, etc. Accordingly, in the illustrated at least one example embodiment, the read of the complete first exposure row 302 (e.g., the long read) and the read of the complete second exposure row 304 (e.g., the short read) has been completed at 2-H time. In particular, odd columns of the first exposure row 302 were read at 1-H time while even columns of the first exposure row 302 were read at 2-H time. Similarly, even columns of the second exposure row 304 were read at 1-H time while odd columns of the second exposure row 304 were read at 2-H time, etc.

Thus, for pixel value readout, in subsequent H-times, pixel values from a remaining set of columns (e.g., the remaining columns, the unread columns, etc.) from among the plurality of columns in the first exposure row 302 may be read, and pixel values from a remaining set of columns (e.g., the remaining columns, the unread columns, etc.) from among the plurality of columns in the second exposure row 304 may be read, etc. For the first exposure row 302, when the first set of columns (e.g., odd columns) are read at the 1-H time, the remaining set of columns include the second set of columns (e.g., even columns) at the 2-H time, but are not limited thereto. Similarly, for the second exposure row, when the second set of columns (e.g., even columns) are read at the 1-H time, the remaining set of columns include the first set of columns (e.g., odd columns) at the 2-H time, etc. In other words, the first set of columns include one of odd or even columns from among the plurality of columns and the second set of columns include other of the odd or even columns from among the plurality of columns. The second set of columns is even columns in the second exposure row 304 when the first set of columns is odd columns in the first exposure row 302, but the example embodiments are not limited thereto. The second set of columns is odd columns in the second exposure row 304 when the first set of columns is even columns in the first exposure row 302, but is not limited thereto.

Accordingly, the pixel values from the plurality of columns in the first exposure row 302 may be successively read until each column in the first exposure row 302 is read by the first set of ADCs 306. Further, the pixel values from the plurality of columns in the second exposure row 304 may be successively read until each column in the second exposure row 304 is read by the second set of ADCs 308.

As seen in FIG. 3B, once the readout is done for the first exposure row 302 and the second exposure row 304, the process may continue for the next exposure rows in subsequent H-times, etc. For instance, at 3-H time, the long exposure read may be performed from the odd columns of row 302+1, while short exposure read may be performed from the even columns of row 304+1, etc. At 4-H time, the long exposure read may be performed from the even columns of row 302+1, while short exposure read may be performed from the odd columns of row 304+1, etc.

It is appreciated that although the pixel array is shown as having 4 columns in the illustrated at least one example embodiment, in other example embodiments the pixel array may be of a different matrix size. Further, the illustrated at least one example embodiment is described for a long and short exposure, however, the details are also applicable for multiple exposures (exposure A, exposure B, exposure C . . . exposure N for row A, row B, row C . . . row N having ADCs A, ADCs B, ADCs C . . . ADCs N), etc. Further, the readout from odd and even columns is a non-limiting example, and the readout may be from any set of columns from the exposure rows, etc.

Figure 4A:
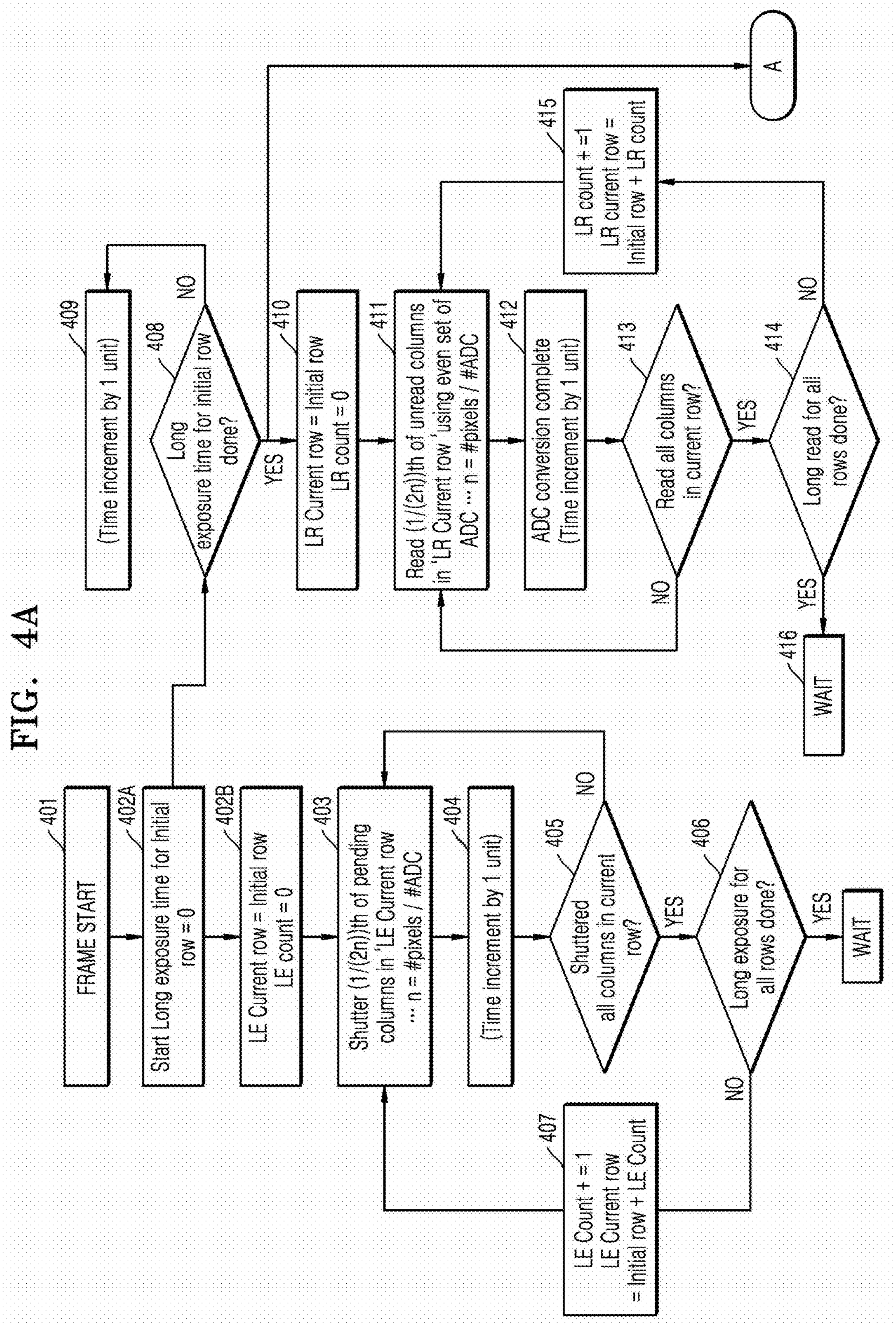
FIGS. 4A-4B illustrate the operational flow associated with readout of the pixel array, according to one or more example embodiments disclosed herein.
Figure 4B:
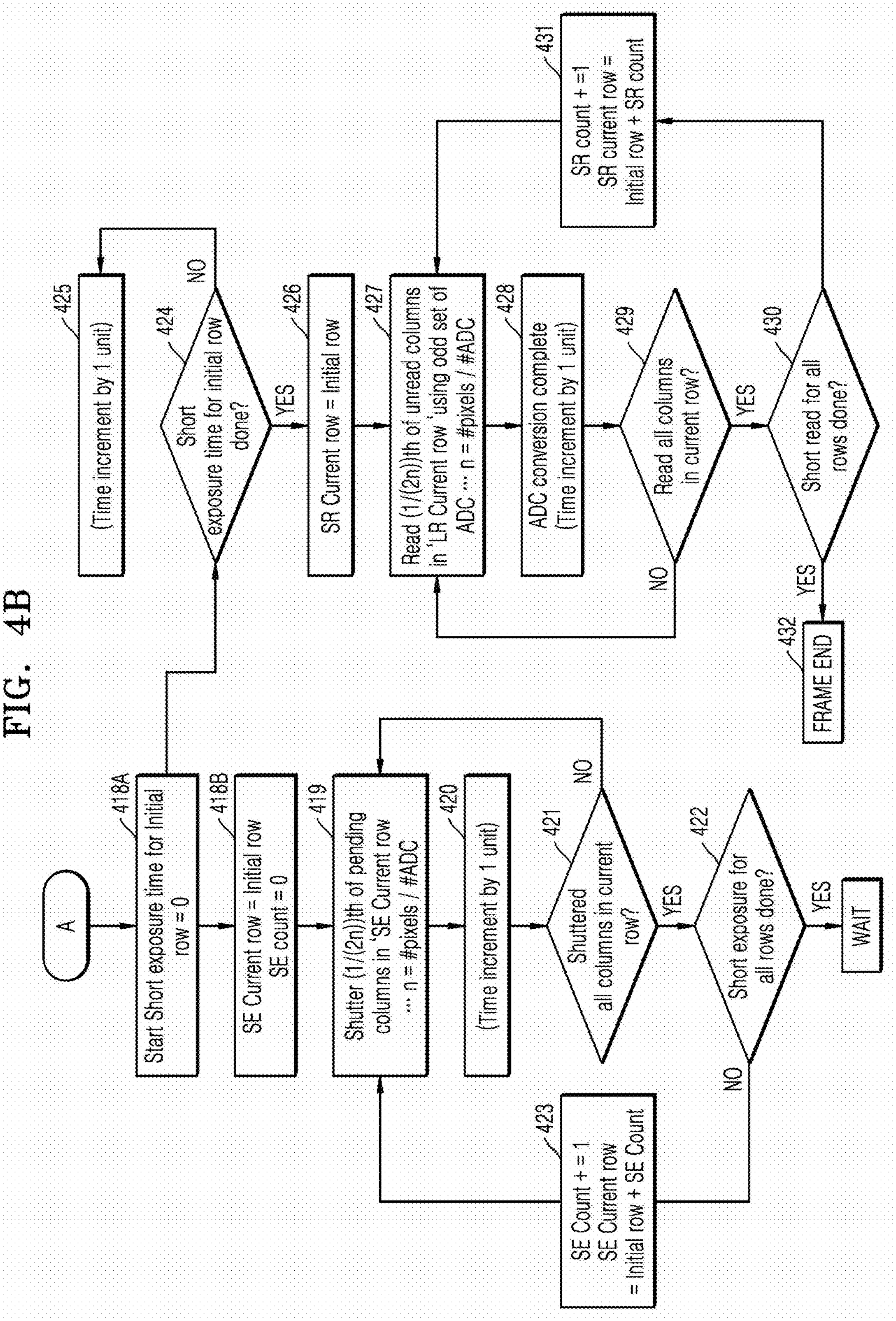

Reference is now made to FIGS. 4A-4B to describe the operational flow associated with readout of the pixel array 204, according to one or more example embodiments. It is appreciated that the operational flow is described with reference to the example of two exposures, e.g., for long exposure and short exposure, but the example embodiments are not limited thereto. For example, the operational flow is equally applicable for more than two exposures, etc.

The process starts at operation 401 for a given frame (e.g., a current image frame). The processing circuitry 210 of the device 200 may start a long exposure (LE) time (e.g., LE time period) for a first exposure row. The first exposure row may be referred to as 'LE current row'. As this is the initial operation, the LE Current row may be an LE initial row, e.g., LE initial row=0, as seen at operation 402A, but is not limited thereto. As seen at operation 402B, the long exposure time starts for the Initial row. The processing circuitry 210 may start a long exposure count (LE count) to track the number of long exposures performed of the rows within the frame. The LE count may initially be 0.

At operation 403, the processing circuitry 210 may shutter (e.g., read, readout, etc.) a first set of columns from the LE current row. In at least one example embodiment, the processing circuitry 210 may not shutter the entire row, and rather the processing circuitry 210 may shutter a sub-set of columns from among all of the columns are shuttered (e.g., readout) during one time period (H-time). The first set of columns to be shuttered may be selected and/or configured as desired and/or predetermined. For instance, the first set of columns may be odd columns, even columns, every 3rd column, and/or any other combination without departing from the scope of the example embodiments of the inventive concepts. As a non-limiting example, shutter of (1/(2n))th columns in the LE current row may be performed, where n refers to number or pixels/number of ADCs.

At operation 404, the processing circuitry 210 may increment the time-step (H-time) by 1 unit to continue the long exposure. At operation 405, the processing circuitry 210 may determine whether the shutter for all of the columns in the LE current row has been completed. In the present scenario, as the (1/(2n))th columns are shuttered at operation 403, the process moves from operation 405 to operation 403 and the processing circuitry 210 may shutter the remaining columns from the LE current row. Thus, the process may cycle between operations 403-405 until all of the columns in the LE current row are shuttered. Once all of the columns in the LE current row have been read, the processing circuitry 210 may shutter columns from a next LE current row. At operation 406, the processing circuitry 210 may determine whether the long exposure for all of the rows has been completed. In the case where the long exposure for all of the rows have not been completed, at operation 407, the processing circuitry 210 may increment the LE count by 1 and the processing circuitry 210 may determine the next LE current row based on equation (1):

$$LE \text{ current row} = LE \text{ Initial row} + LE \text{ count} \quad (1)$$

The processing circuitry 210 may perform the long exposure for the next LE current row using the details provided in operations 403-406. Similarly, the processing circuitry 210 may perform the long exposure for all of the rows in the frame. At operation 406, when the processing circuitry 210 determines that the long exposure for all of the rows has been completed, the processing circuitry 210 then waits.

Further, as the long exposure times are being completed for the rows, the long exposure reads may also be performed for the rows to capture the values from the pixels exposed for the long exposure times. At operation 408, it is determined whether the long exposure time for the LE initial row is completed. At operation 409, the time is incremented by 1 unit to continue till the long exposure time is complete. Once the long exposure time is completed for the LE initial row, the readout may be performed. In an example embodiment, the short exposure time for the LE initial row (the row for which long exposure is complete) is to be started and for a given row, the short exposure starts only after the values from the given row for the short exposure have been read. It is appreciated that although the flow depicted in FIG. 4A-4B is explained with the short exposure starting after the long exposure reads, the example embodiments of the inventive concepts are not limited thereto and the details provided are also applicable for other HDR methods as well without departing from the scope of the example embodiments of the inventive concepts. As a non-limiting example, dedicated pixels may be provided for short and long exposures and the short exposure need not start after read of long exposure (in view of separate pixels), etc.

Referring to the long exposure reads (LR), at operation 410, the processing circuitry 210 may initially set the LR current row as the LE initial row (the row for which long exposure is complete). Further, the processing circuitry 210 may maintain a LR count to track the rows for which LR reads are being performed. Initially, the LR count may be 0.

At operation 411, the processing circuitry 210 may read a first set of columns from the LR current row. In at least one example embodiment, the entire row is not read, and rather, the processing circuitry 210 may read a sub-set of columns from among all of the columns are read during one time period (H-time). The first set of columns may be desired and/or predetermined. For instance, the first set of columns may be odd columns, even columns, every 3rd column, and any other combination without departing from the scope of the example embodiments of the inventive concepts. Further, the processing circuitry 210 may read the first set of columns from a first set of ADCs which may be dedicated for the exposure being performed. In the present case, the processing circuitry 210 may read the first set of ADCs used for reading values of long exposures. As a non-limiting example, read operations of $(1/(2n))^{th}$ columns in the LR current row may be performed using the even set(s) of ADCs, where n refers to number or pixels/number of ADCs, but is not limited thereto. In at least one example embodiment, the processing circuitry 210 may read the entire row read during one time period (H-time) using the long exposure ADC (e.g., the first set of ADCs), etc. For instance, the number of the first set of ADCs may be greater than the number of columns and in such a scenario the entire row may be read. Further, in at least one example embodiment, another entire row may be read using short exposure ADCs (e.g., a second set of ADCs) in case the number of the first set of ADCs may be greater than the number of columns. However, according to at least one example embodiment, the data read from long exposure rows and short exposure rows are passed to separate outputs lines to avoid data corruption, etc.

At operation 412, the processing circuitry 210 may determine whether the ADC conversion is complete. The processing circuitry 210 may also increment the time by 1 unit. For the long exposure, the processing circuitry 210 may perform the read for the remaining columns of the LR current row. At operation 413, the processing circuitry 210 may determine whether the read for all of the columns in the LR current row has been completed. In the present scenario, as the $(1/(2n))^{th}$ columns are read at operation 411, the processing circuitry 210 moves from operation 413 to operation 411 in order to read the remaining columns from the LR current row. Thus, the processing circuitry 210 may cycle between operations 411-413 until all of the columns in the LR current row are read. Once all of the columns in the LR current row are read, the processing circuitry 210 moves to read columns from a next LR current row. At operation 414, the processing circuitry 210 may determine whether the long read for all of the rows has been completed. In the case where the long read for all of the rows has not been completed, at operation 415, the processing circuitry 210 may increment the LR count by 1, and the processing circuitry 210 may determine the next LR current row based on equation (2). It is to be noted that the LE count rate increment is similar to LR count rate increment, in-order to maintain uniform exposure time for all of the pixels in a frame.

$$LR \text{ current row} = LR \text{ Initial row} + LR \text{ count} \tag{2}$$

The processing circuitry 210 may perform the long read for the next LR current row using the details provided in operations 411-414. Similarly, the processing circuitry 210 may perform the long read for all of the rows in the frame. At operation 414, when the processing circuitry 210 determines that the long read for all of the rows has been completed, the processing circuitry 210 then waits at operation 416.

Referring to the short exposure times (SE) and short exposure reads (SR), at operation 418A, the processing circuitry 210 may start the short exposure time for 'SE current row'. In at least one example embodiment, the SE current row may correspond to the row for which a long exposure read has been completed, but is not limited thereto. As mentioned above, the details provided for the example embodiments of the inventive concepts are also applicable for other HDR methods as well (such as where short exposure do not start after a read operation of long exposure, etc.) without departing from the scope of the example embodiments of the inventive concepts. Initially, the SE current row may be referred to as 'SE initial row', e.g., SE initial row=0. As seen at operation 418B, the processing circuitry 210 may start the short exposure time for the Initial row. The processing circuitry 210 may maintain a short exposure count (SE count) to track the short exposures performed of the rows within the frame. The SE count may initially be 0.

At operation 419, the processing circuitry 210 may shutter a second set of columns from and/or included in the SE current row. In at least one example embodiment, the processing circuitry 210 may not shutter the entire row, but rather, the processing circuitry 210 may shutter a sub-set of columns from among all of the columns of the pixel array during one time period (H-time). The second set of columns may be desired and/or predetermined. For instance, the second set of columns may be odd columns, even columns, every 3rd column, and any other combination without departing from the scope of the example embodiments of the inventive concepts. As a non-limiting example, the processing circuitry 210 may perform a shutter of $(1/(2n))^{th}$ columns in the SE current row, where n refers to number or pixels/number of ADCs.

At operation 420, the processing circuitry 210 may increment the time-step (H-time) by 1 unit to continue the short exposure. At operation 421, the processing circuitry 210 may determine whether the shutter for all of the columns in the SE current row has been completed. In the present scenario, as the $(1/(2n))^{th}$ columns are shuttered at operation 419, the processing circuitry 210 moves from operation 421 to operation 419 in order to shutter the remaining columns from the SE current row. Thus, the processing circuitry 210 may cycle between operations 410-421 until all of the columns in the SE current row are shuttered.

Once all of the columns in the LE current row are read, the processing circuitry 210 moves to shutter columns from a next SE current row. At operation 422, the processing circuitry 210 may determine whether the short exposure for all of the rows has been completed. In the case where the short exposure for all of the rows has not been completed, at operation 423, the processing circuitry 210 may increment the SE count by 1, and the processing circuitry 210 may determine the next SE current row based on equation (3):

$$SE \text{ current row} = SE \text{ Initial row} + SE \text{ count} \tag{3}$$

The processing circuitry 210 may then perform the short exposure for the next SE current row using the details provided in operations 419-422. Similarly, the processing circuitry 210 may perform the short exposure for all of the rows in the frame. At operation 422, when the processing circuitry 210 determine that the short exposure for all of the rows has been completed, the processing circuitry 210 may then wait.

Further, as the short exposure times are being completed for the rows, the processing circuitry 210 may also perform short exposure reads (SR) performed for the rows to capture the values from the short exposure times. At operation 424, the processing circuitry 210 may determine whether the short exposure time for the SE initial row has been completed. At operation 425, the processing circuitry 210 may increment the time by 1 unit to continue until the short exposure time has been completed. Once the short exposure time is completed for the SE initial row, the processing circuitry 210 may perform the readout. At operation 426, the SR current row is initially the SE initial row (e.g., the row for which short exposure has been completed). Further, the processing circuitry 210 may maintain a SR count to track the rows for which SR reads are being performed. Initially, the SR count may be 0.

At operation 427, the processing circuitry 210 may read a second set of columns from the SR current row. As described above, the entire row is not read, but rather, the processing circuitry 210 may read a sub-set of columns from among all of the columns during one time period (H-time). The second set of columns may be desired and/or predetermined, such as odd columns, even columns, and any other combination without departing from the scope of the example embodiments of the inventive concepts. Further, the processing circuitry 210 may read the second set of columns from a second set of ADCs which may be dedicated for the exposure being performed. In the present case, the second set of ADCs may be used for reading values of short exposure, but the example embodiments are not limited thereto. As a non-limiting example, read of $(1/(2n))^{th}$ columns in the SR current row may be performed using odd set of ADCs, where n refers to number or pixels/number of ADCs, etc.

At operation 428, the processing circuitry 210 may determine whether the ADC conversion has been completed. The processing circuitry 210 may increment the time by 1 unit. For the short exposure, the processing circuitry 210 may perform the read for the remaining columns of the SR current row. At operation 429, the processing circuitry 210 may determine whether the read for all of the columns in the SR current row has been completed. In the present scenario, as the $(1/(2n))^{th}$ columns are read at operation 427, the processing circuitry 210 moves from operation 429 to operation 427 in order to read the remaining columns from the SR current row. Thus, the processing circuitry 210 may cycle between operations 427-429 until all of the columns in the SR current row are read. Once all of the columns in the SR current row are read, the processing circuitry 210 may move to read columns from a next SR current row. At operation 430, the processing circuitry 210 may determine whether the short read for all of the rows has been completed. In the case where the short read for all of the rows has not completed, at operation 431, the processing circuitry 210 may increment the SR count by 1 and the next SR current row is determined based on equation (4). It is to be noted that the SE count rate increment is similar to SR count rate increment, in-order to maintain uniform exposure time for all pixels in a frame.

$$SR\text{ current row} = SR\text{ Initial row} + SR\text{ count} \tag{4}$$

The processing circuitry 210 may perform the short read for the next SR current row using the details provided in operations 427-430. Similarly, the short read may be performed for all of the rows in the frame. At operation 430, when the processing circuitry 210 determines that the long read for all the rows has been completed, the exposure and read for the frame then ends at operation 432.

Figure 5:
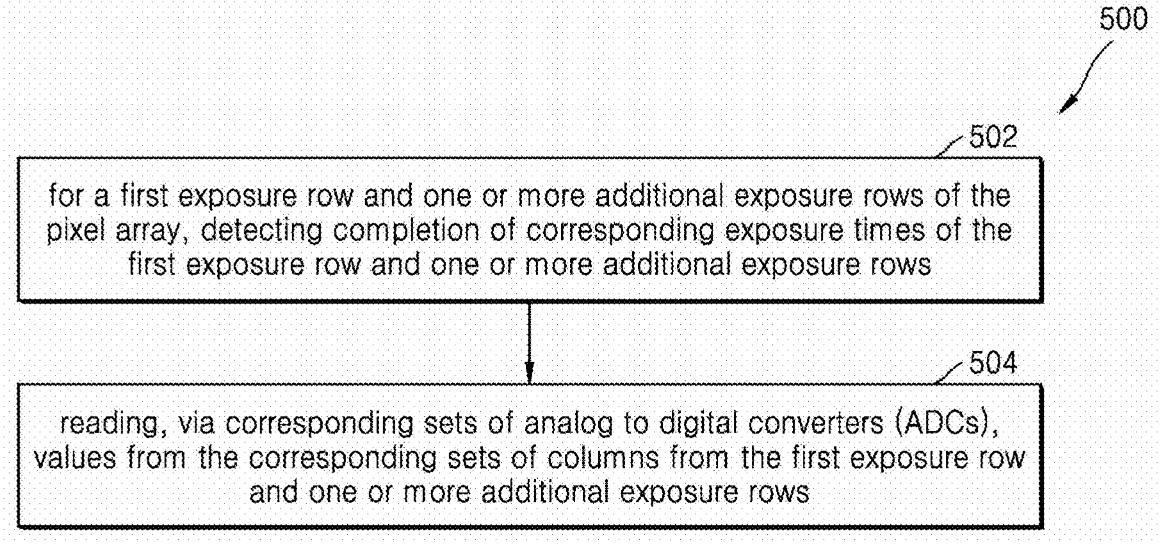
FIG. 5 illustrates a flow chart of a method of performing readout of a pixel array associated with an image sensor, according to one or more example embodiments disclosed herein.

FIG. 5 illustrates the flow chart of a method 500 for performing readout of a pixel array associated with an image sensor, according to one or more example embodiments. The method 500 may be performed by the processing circuitry 210 in conjunction with the pixel array 204 and the plurality of ADCs 206, but is not limited thereto. At operation 502, for a first exposure row and one or more additional exposure rows of the pixel array 204, the processing circuitry 210 may detect completion of corresponding exposure times of the first exposure row and one or more additional exposure rows, etc.

At operation 504, the processing circuitry 210 may read, via corresponding sets of ADCs, values from the corresponding sets of columns from the first exposure row and one or more additional exposure rows. In at least one example embodiment, the corresponding sets of ADCs include a first set of ADCs having a first ramp gain and one or more additional sets of ADCs having corresponding additional ramp gains. In at least one example embodiment, the processing circuitry 210 may read, from the first set of ADCs within a first time period (H-time), pixel values from a first set of columns from among a plurality of columns in the first exposure row of the pixel array 204. In at least one example embodiment, the processing circuitry 210 may read, from the one or more additional sets of ADCs within the first time period, pixel values from corresponding second set of columns from among the plurality of columns in the one or more additional exposure rows of the pixel array 204. The first set of columns may be different from the corresponding second set of columns, but are not limited thereto.

While the above discussed method operations in FIG. 5 are shown and described in a particular sequence, the method operations may occur in variations to the sequence, such as rearrangement of the operations, combination of two or more operations, omission of one or more operations, and/or inclusion of additional operations, etc., in accordance with various example embodiments. Further, a detailed description related to the various operations of FIG. 5 is already covered in the description related to FIGS. 2-4 and are omitted herein for the sake of brevity.

Figure 6:
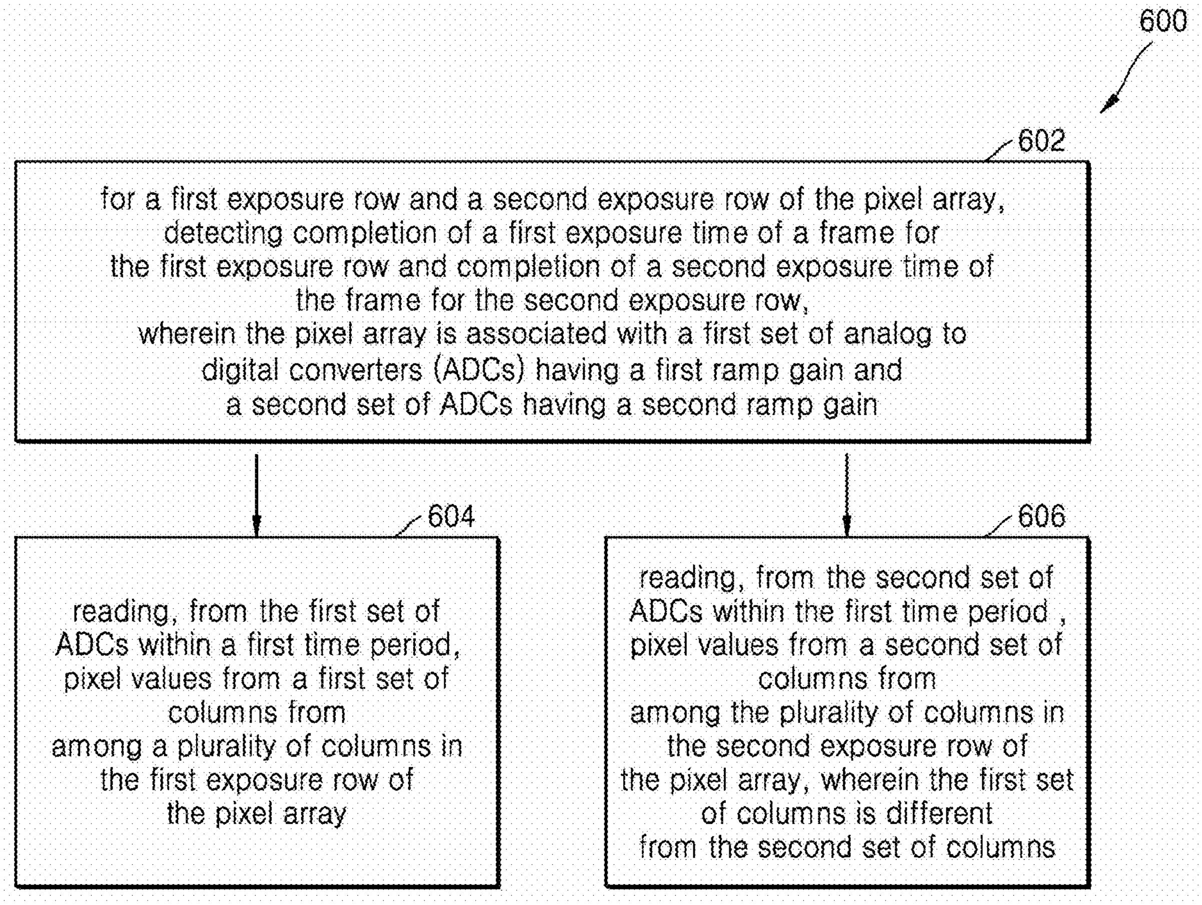
FIG. 6 illustrates a flow chart of a method of performing readout of a pixel array associated with an image sensor, according to one or more example embodiments disclosed herein.

FIG. 6 illustrates the flow chart of another method 600 for performing readout of a pixel array associated with an image sensor, according to one or more example embodiments disclosed herein. The method 600 may be performed by the processing circuitry 210 in conjunction with the pixel array 204 and the plurality of ADCs 206, but is not limited thereto. At operation 602, for a first exposure row and a second exposure row of the pixel array 204, the processing circuitry 210 may detect completion of a first exposure time of a frame for the first exposure row and completion of a second exposure time of the frame for the second exposure row, etc. In at least one example embodiment, the pixel array is associated with a first set of analog to digital converters (ADCs) having a first ramp gain and a second set of ADCs having a second ramp gain, but is not limited thereto.

At operation 604, the processing circuitry 210 may read, from the first set of ADCs within a first time period, pixel values from a first set of columns from among a plurality of columns in the first exposure row of the pixel array 204.

At operation 606, the processing circuitry 210 may read, from the second set of ADCs within the first time period, pixel values from a second set of columns from among the plurality of columns in the second exposure row of the pixel array 204. In at least one example embodiment, the first set of columns may be different from the second set of columns.

In at least one example embodiment, the processing circuitry 210 may read, from the first set of ADCs within a second time period, pixel values from a remaining set of columns from among the plurality of columns in the first exposure row of the pixel array 204. In at least one example embodiment, the processing circuitry 210 may read, from the second set of ADCs within the second time period, pixel values from a remaining set of columns from among the plurality of columns in the second exposure row of the pixel array 204.

In at least one example embodiment, for the first exposure row, when the first set of columns are read at the first time period, the remaining set of columns include the second set of columns at the second time period. In at least one example embodiment, for the second exposure row, when the second set of columns are read at the first time period, the remaining set of columns include the first set of columns at the second time period.

In at least one example embodiment, the processing circuitry 210 may successively read the pixel values from the plurality of columns in the first exposure row of the pixel array until each column in the first exposure row of the pixel array is read by the first set of ADCs. In at least one example embodiment, the processing circuitry 210 may successively read the pixel values from the plurality of columns in the second exposure row of the pixel array until each column in the second exposure row of the pixel array is read by the second set of ADCs.

In at least one example embodiment, the processing circuitry 210 may read the pixel values from the second set of columns in the second exposure row of the pixel array by the second set of ADCs simultaneously with respect to reading of the pixel values from the first set of columns in the first exposure row of the pixel array by the first set of ADCs.

While the above discussed method operations in FIG. 6 are shown and described in a particular sequence, the method operations may occur in variations to the sequence, such as rearrangement of the operations, combination of two or more operations, omission of one or more operations, and/or inclusion of additional operations, etc., in accordance with various example embodiments. Further, a detailed description related to the various operations of FIG. 6 is already covered in the description related to FIGS. 2-4 and is omitted herein for the sake of brevity.

The proposed readout technique achieves high dynamic range and higher frames per second (fps) in comparison to conventional HDR readout techniques. In the described readout technique, different sets of columns are read for different exposures, however, the ADCs remain dedicated for the exposure times with respective fixed ramp gains. As the ramp gain does not change, the ADCs do not desire and/or need additional settling time and therefore the H-time can remain the same. This leads to a significant increase in the 'fps' of the image sensor. Moreover, the power and area impact are negligible since the number of ADCs being used remains the same as in conventional techniques. In addition, in cases where 'fps' is kept same in both conventional techniques and the column interleaved technique(s) as disclosed in the example embodiments, there is lower average power consumption in the example embodiments in comparison to conventional techniques due to increased vertical blank time.

Unless otherwise defined, all technical and scientific terms used herein have the same meaning as commonly understood by one ordinary of ordinary skill in the art to which this inventive concepts belongs. The system, methods, and examples provided herein are illustrative only and not intended to be limiting.

While specific language has been used to describe the inventive concepts, any limitations arising on account thereto, are not intended. As would be apparent to a person of ordinary skill in the art, various working modifications may be made to the method to implement the various example embodiments of the inventive concepts as taught herein. The drawings and the forgoing description give examples of various example embodiments. Those of ordinary skill in the art will appreciate that one or more of the described elements may well be combined into a single functional element. Alternatively, certain elements may be split into multiple functional elements. Elements from one example embodiment may be added to another example embodiment.

The various example embodiments disclosed herein can be implemented using at least one hardware device and performing network management functions to control the elements.

The foregoing description of the specific example embodiments will so fully reveal the general nature of the example embodiments herein that others can, by applying current knowledge, readily modify and/or adapt for various applications such specific example embodiments without departing from the inventive concepts, and, therefore, such adaptations and modifications should and are intended to be comprehended within the meaning and range of equivalents of the disclosed example embodiments. It is to be understood that the phraseology or terminology employed herein is for the purpose of description and not of limitation. Therefore, while the example embodiments herein have been described, those of ordinary skill in the art will recognize that the example embodiments herein can be practiced with modification within the scope of the example embodiments as described herein.

We claim:

1. A method for performing readout of a pixel array associated with an image sensor, the method comprising:

for a first exposure row and one or more additional exposure rows of the pixel array, detecting, using processing circuitry, completion of exposure operations of the first exposure row and the one or more additional exposure rows;

adjusting, using the processing circuitry, a readout time period based on results of the detecting; and reading, using the processing circuitry, pixel values from sets of columns associated with sets of analog to digital converters (ADCs) corresponding to the first exposure row and the one or more additional exposure rows, using the adjusted readout time period, the reading the pixel values including, reading from a first set of ADCs of the sets of ADCs within the adjusted readout time period, pixel values from a first set of columns associated with the first exposure row of the pixel array corresponding to the first set of ADCs, and reading from a second set of ADCs of the sets of ADCs within the adjusted readout time period, pixel values from a second set of columns associated with the one or more additional exposure rows of the pixel array associated corresponding to the second set of ADCs.

2. The method as claimed in claim 1, wherein the first set of ADCs has a first ramp gain; and one or more additional sets of ADCs have second ramp gains, the second ramp gains being different from the first ramp gain, the one or more additional sets of ADCs including the second set of ADCs.

3. The method as claimed in claim 1, wherein the first set of columns includes odd columns of a plurality of columns in the first exposure row of the pixel array, and the second set of columns includes even columns of a plurality of columns in the one or more additional exposure rows of the pixel array.

4. The method as claimed in claim 1, wherein the first set of columns includes even columns of a plurality of columns in the first exposure row of the pixel array, and the second set of columns includes odd columns of a plurality of columns in the one or more additional exposure rows of the pixel array.

5. The method as claimed in claim 1, wherein the adjusted readout time period is a first time period; and the reading the pixel values further includes, reading, from the first set of ADCs within a second time period consecutive to the first time period, pixel values from at least one column other than the first set of columns associated with the first set of ADCs from among a plurality of columns in the first exposure row of the pixel array; and reading, from one or more additional sets of ADCs within the second time period, pixel values from at least one column other than the second set of columns associated with the one or more additional sets of ADCs from among a plurality of columns in the one or more additional exposure rows of the pixel array.

6. The method as claimed in claim 1, wherein exposure times corresponding to each of the first exposure row and the one or more additional exposure rows are different from each other.

7. The method as claimed in claim 6, wherein each of a first ramp gain of the first set of ADCs and second ramp gains of the second set of ADCs are related to the exposure times of the first exposure row and the one or more additional exposure rows.

8. A system for performing readout of a pixel array associated with an image sensor, the system comprising:

processing circuitry, the processing circuitry being configured to cause the system to, for a first exposure row and one or more additional exposure rows of the pixel array, detect completion of corresponding exposure operations of the first exposure row and the one or more additional exposure rows;

adjusting, using the processing circuitry, a readout time period based on results of the detecting; and read pixel values from sets of columns associated with sets of analog to digital converters (ADCs) corresponding to the first exposure row and the one or more additional exposure rows using the adjusted readout time period, the reading the pixel values including, reading from a first set of ADCs of the sets of ADCs within the adjusted readout time period, pixel values from a first set of columns associated with the first exposure row of the pixel array corresponding to the first set of ADCs, and reading from a second set of ADCs of the sets of ADCs within the adjusted readout time period, pixel values from a second set of columns associated with the one or more additional exposure rows of the pixel array associated corresponding to the second set of ADCs.

9. The system as claimed in claim 8, wherein the first set of ADCs has a first ramp gain; and one or more additional sets of ADCs have second ramp gains, the second ramp gains being different than the first ramp gain, the one or more additional sets of ADCs including the second set of ADCs.

10. The system as claimed in claim 8, wherein the first set of columns include one of odd or even columns of a plurality of columns in the first exposure row of the pixel array; and the second set of columns are even columns of a plurality of columns in the one or more additional exposure rows in response to the first set of columns being the odd columns in the first exposure row, and the second set of columns are odd columns of the plurality of columns in the one or more additional exposure rows in response to the first set of columns being the even columns in the first exposure row.

11. The system as claimed in claim 8, wherein the adjusted readout time period is a first time period; and the processing circuitry is further configured to cause the system to, read, from the first set of ADCs within a second time period consecutive to the first time period, pixel values from at least one column other than the first set of columns associated with the first set of ADCs from among a plurality of columns in the first exposure row of the pixel array; and read, from one or more additional sets of ADCs within the second time period, pixel values from at least one column other than the second set of columns associated with the one or more additional sets of ADCs from among a plurality of columns in the one or more additional exposure rows of the pixel array.

12. The system as claimed in claim 11, wherein the at least one column other than the first set of columns in the first exposure row is included in the second set of columns, and the at least one column other than the second set of columns in the one or more additional exposure rows is included in the first set of columns.

13. The system as claimed in claim 11, wherein the processing circuitry is further configured to cause the system to:

simultaneously read the pixel values from the second set of columns in the one or more additional exposure rows of the pixel array using the one or more additional sets of ADCs and the pixel values from the first set of columns in the first exposure row of the pixel array using the first set of ADCs.

14. The system as claimed in claim 13, wherein the processing circuitry is further configured to cause the system to:

simultaneously read the pixel values from the at least one column other than the second set of columns in the one or more additional exposure rows of the pixel array using the one or more additional sets of ADCs and the pixel values from the at least one column other than the first set of columns in the first exposure row of the pixel array using the first set of ADCs.

* * * * *